US008234120B2

(12) United States Patent
Agapi et al.

(10) Patent No.: US 8,234,120 B2
(45) Date of Patent: Jul. 31, 2012

(54) PERFORMING A SAFETY ANALYSIS FOR USER-DEFINED VOICE COMMANDS TO ENSURE THAT THE VOICE COMMANDS DO NOT CAUSE SPEECH RECOGNITION AMBIGUITIES

(75) Inventors: Ciprian Agapi, Lake Worth, FL (US); Oscar J. Blass, Boynton Beach, FL (US); Brennan D. Monteiro, Boca Raton, FL (US); Roberto Vila, Hollywood, FL (US)

(73) Assignee: Nuance Communications, Inc., Burlington, MA (US)

( * ) Notice: Subject to any disclaimer, the term of this patent is extended or adjusted under 35 U.S.C. 154(b) by 865 days.

(21) Appl. No.: 11/460,075

(22) Filed: Jul. 26, 2006

(65) Prior Publication Data

US 2008/0046250 A1   Feb. 21, 2008

(51) Int. Cl.
  *G10L 21/00*  (2006.01)
  *G10L 15/22*  (2006.01)
  *H04H 20/47*  (2008.01)
(52) U.S. Cl. ............................ 704/275; 381/2
(58) Field of Classification Search .................. 704/275, 704/256.2; 395/333; 709/206; 345/156
See application file for complete search history.

(56) References Cited

U.S. PATENT DOCUMENTS

| 5,442,376 A * | 8/1995 | Tannenbaum et al. ........ 345/156 |
| 5,559,925 A | 9/1996 | Austin |
| 5,715,369 A | 2/1998 | Spoilman et al. |
| 5,748,191 A * | 5/1998 | Rozak et al. .................. 715/728 |
| 5,774,628 A | 6/1998 | Hemphill |
| 5,832,430 A | 11/1998 | Lleida et al. |
| 5,991,712 A | 11/1999 | Martin |
| 6,134,527 A | 10/2000 | Meunier et al. |
| 6,263,308 B1 | 7/2001 | Heckerman et al. |
| 6,269,335 B1 | 7/2001 | Ittycheriah et al. |
| 6,275,797 B1 | 8/2001 | Randic |
| 6,377,662 B1 | 4/2002 | Hunt et al. |
| 6,421,672 B1 | 7/2002 | McAllister et al. |
| 6,505,155 B1 | 1/2003 | Vanbuskirk et al. |
| 6,523,004 B1 | 2/2003 | Vanbuskirk et al. |
| 6,570,964 B1 | 5/2003 | Murveit et al. |

(Continued)

OTHER PUBLICATIONS

Trabelsi, Z., et al., "Multimodal Integration of Voice and Ink for Pervasive Computing", Proc. of IEEE 4th Int'l. Sym. on Multimedia Software Engineering (MSE '02), 2002.

*Primary Examiner* — Talivaldis Ivars Smits
*Assistant Examiner* — Farzad Kazeminezhad
(74) *Attorney, Agent, or Firm* — Wolf, Greenfield & Sacks, P.C.

(57) ABSTRACT

The present invention discloses a solution for assuring user-defined voice commands are unambiguous. The solution can include a step of identifying a user attempt to enter a user-defined voice command into a voice-enabled system. A safety analysis can be performed on the user-defined voice command to determine a likelihood that the user-defined voice command will be confused with preexisting voice commands recognized by the voice-enabled system. When a high likelihood of confusion is determined by the safety analysis, a notification can be presented that the user-defined voice command is subject to confusion. A user can then define a different voice command or can choose to continue to use the potentially confusing command, possibly subject to a system imposed confusion mitigating condition or action.

20 Claims, 4 Drawing Sheets

U.S. PATENT DOCUMENTS

| | | |
|---|---|---|
| 6,622,121 B1 | 9/2003 | Crepy et al. |
| 6,816,837 B1 * | 11/2004 | Davis .......................... 704/275 |
| 6,826,306 B1 | 11/2004 | Lewis et al. |
| 6,839,667 B2 | 1/2005 | Reich |
| 7,035,799 B1 | 4/2006 | Hauenstein |
| 7,117,153 B2 | 10/2006 | Mahajan et al. |
| 7,139,706 B2 | 11/2006 | Yuschik |
| 7,165,031 B2 | 1/2007 | Rees |
| 7,509,259 B2 * | 3/2009 | Song .......................... 704/256.2 |
| 2002/0049593 A1 | 4/2002 | Shao |
| 2002/0082833 A1 | 6/2002 | Marasek et al. |
| 2002/0120452 A1 | 8/2002 | Davis et al. |
| 2002/0173955 A1 | 11/2002 | Reich |
| 2002/0188451 A1 | 12/2002 | Guerra et al. |
| 2003/0004722 A1 | 1/2003 | Butzberger et al. |
| 2003/0163319 A1 | 8/2003 | Kemble et al. |
| 2003/0191639 A1 | 10/2003 | Mazza |
| 2003/0200096 A1 * | 10/2003 | Asai .......................... 704/275 |
| 2004/0088285 A1 | 5/2004 | Martin et al. |
| 2004/0193403 A1 | 9/2004 | Creamer et al. |
| 2005/0036589 A1 | 2/2005 | Bossemeyer |
| 2005/0086055 A1 | 4/2005 | Sakai et al. |
| 2005/0165607 A1 | 7/2005 | Di Fabbrizio et al. |
| 2005/0226396 A1 | 10/2005 | Davis et al. |
| 2005/0238145 A1 | 10/2005 | Knott et al. |
| 2006/0004826 A1 | 1/2006 | Zartler et al. |
| 2006/0013487 A1 | 1/2006 | Longe et al. |
| 2006/0025996 A1 | 2/2006 | Ju et al. |
| 2006/0106614 A1 * | 5/2006 | Mowatt et al. ................ 704/275 |
| 2006/0149824 A1 * | 7/2006 | Park et al. .................... 709/206 |

\* cited by examiner

__US 8,234,120 B2__

PERFORMING A SAFETY ANALYSIS FOR USER-DEFINED VOICE COMMANDS TO ENSURE THAT THE VOICE COMMANDS DO NOT CAUSE SPEECH RECOGNITION AMBIGUITIES

BACKGROUND

1. Field of the Invention

The present invention relates to the field of speech technologies, and, more particularly, to performing a safety analysis for user-defined voice commands to ensure that the voice commands do not cause speech recognition ambiguities with a set of preexisting voice commands.

2. Description of the Related Art

Voice-enabled systems often permit users to define a set of actions which are automatically executed in the future responsive to a user-defined voice command The set of actions can be referred to as an abstraction. Many different types of abstractions exist including scripts, macros, and collections. A script can be a time dependent abstraction. A macro can be a sequence of ordered steps or actions, where the beginning of one step is contingent upon a completion of an earlier step. A collection can include a set of asynchronous actions. The user-defined voice command that triggers an execution of an abstraction can have a logical relationship to the set of actions to be performed. For example, a user can define an abstraction "Wake-Up" consisting of a series of steps where a computing system (1) sounds an alarm, (2) starts to brew a cup of coffee, (3) starts a shower, and (4) prints a dally calendar for the user.

Voice-enabled systems often allow a user to invoke an abstraction in more than one way. One way is to preface an abstraction name with a keyword, such as "Playback" or "Execute." For example, the abstraction above can be invoked with the voice command "Playback Wake-Up". Another, and more natural, way to invoke an abstraction is to issue the abstraction name by itself, without a trigger word. So the exemplary abstraction can be invoked with the voice command "Wake-Up."

Few conventional voice-enabled systems allow users to directly invoke user-defined voice commands due to potential naming conflicts with other voice commands accepted by the system. Instead, most voice-enabled systems require a keyword be provided before a user-defined command. This permits the system to enter a special recognition mode, where the system assumes that a user-defined command follows the keyword. Implementers of conventional voice-enabled systems have mistakenly assumed that use of a keyword alleviates misrecognition problems associated with user-defined voice commands, which is not the case. Further, required use of a keyword results in a less intuitive interface than would result if systems permitted user-defined commands to be directly invoked.

To illustrate the problem, a vehicle can include a voice-enabled system capable of recognizing voice commands and taking action in response to these commands. A system command of "Brake" can result in the brakes of a vehicle being applied to stop the vehicle. A passenger can define a command "Breakfast" that is associated with a series of user-defined actions, such as (1) rolling up the windows, (2) turning on the air conditioner, and (3) playing the radio softly, which together place the vehicle in a passenger-preferred state for the passenger to eat breakfast in the vehicle.

If the vehicle were to allow direct execution of user-defined commands, the vehicle system can easily confuse the command "Breakfast" with "Brake" causing the vehicle to abruptly stop when a command giver desired the windows to roll up, the air conditioner to be turned on, and the radio to be played softly. This problem still is present when a keyword is required before a user command.

For example, a passenger can inadvertently utter "Breakfast" without the keyword, which will most likely be misinterpreted as the command "Brake," which may have unfortunate consequences. Even if the passenger correctly utters the keyword followed by the abstraction name ("Playback Breakfast"), the system can misrecognize or fail to recognize the keyword, which can result in the system misinterpreting the abstraction command as "Brake." Recognition ambiguity issues resulting from systems permitting users to define voice commands have not been addressed within conventional voice-enabled systems.

SUMMARY OF THE INVENTION

The present invention discloses a solution to prevent user-defined voice commands from being misrecognized by voice-enabled systems. The solution performs a safety analysis upon new user-defined commands before the new commands are accepted by the voice-enabled system. The safety analysis can compare existing system commands and existing user-defined commands with a new user-defined command to determine a likelihood of the new command being confused with an existing command. When the likelihood is low, the system can permit the new command to be recorded. Additionally, the system can permit a user to directly invoke the new command without uttering a keyword, such as "Playback" or "Execute." A user is still permitted to utter a keyword before the new command, which makes uttering the keyword before the new command optional instead of mandatory.

When the likelihood of confusion is high, the system can notify a user of a potential conflict between the new voice command and an existing voice command The user can optionally select a different user-defined command which has a lower likelihood of confusion as determined by the safety analysis. Once notified of the potential conflict, the user can also optionally cancel the operation for which the new voice command is being defined. Finally, the user can choose to utilize the new voice command despite the potential confusion.

In this case, one or more confusion mitigating actions relating to the new voice command can be taken by the voice-enabled system. The mitigating action can require the new user-defined command to always be preceded by a keyword, which can minimize conflicts. The mitigating action can also permit a user to alter or delete the existing and potentially conflicting voice command to prevent the potential conflict. The mitigating action can further restrict a set of users (assuming a multi-user voice-enabled system) ability to access the new command and the conflicting command to ensure that conflicts do not arise. For example, if two different and potentially confusing user-defined voice commands exists (one defined by a first user and another defined by a second user), a restriction can be imposed so that only one of the commands is available to each user at any one time, thereby preventing the potential conflict.

The present invention can be implemented in accordance with numerous aspects consistent with material presented herein. For example, one aspect of the present invention can include a method of assuring user-defined voice commands are unambiguous. The method can include a step of identifying a user attempt to enter a user-defined voice command into a voice-enabled system. A safety analysis can be performed on the user-defined voice command to determine a likelihood that the user-defined voice command will be confused with preexisting voice commands recognized by the voice-enabled system. When a high likelihood of confusion is determined by the safety analysis, a notification can be presented that the user-defined voice command is subject to confusion. A user can then define a different voice command or can choose to continue to use the potentially confusing command, possibly subject to a system imposed confusion mitigating condition or action.

Another aspect of the present invention can include a method of adding user-defined abstractions to a voice-enabled system. The method can detect an attempt to record a new abstraction. A user-defined voice command for invoking the new abstraction can then be received. The voice command can be compared against a set of preexisting voice commands to determine whether a potential recognition ambiguity exists between the user-defined voice command and the preexisting voice commands. When a potential recognition ambiguity exists, at least one programmatic action designed to minimize the likelihood of an occurrence of the potential recognition ambiguity can be performed. Actions for the new abstraction can then be recorded. The new abstraction and the associated user-defined voice command can be subsequently accepted. In the future, the user-defined voice command can be used to invoke the new abstraction and to cause the actions to be executed.

Still another aspect of the present invention can include a voice-enabled system including a grammar of user-defined voice commands, a speech recognition engine, and a safety analysis engine. The grammar can include user-defined voice commands, each of which can be associated with at least one programmatic action. The speech recognition engine can accept speech, can compare the speech with the voice commands in the grammar, and can automatically execute programmatic actions associated with the speech commands responsive to a match between the speech and the voice commands. The safety analysis engine can determine a likelihood that new user-defined voice commands will be confused with the voice commands in the grammar. The safety analysis engine can be utilized for each new user-defined voice command before that new user-defined voice command is permitted to be added to the grammar.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
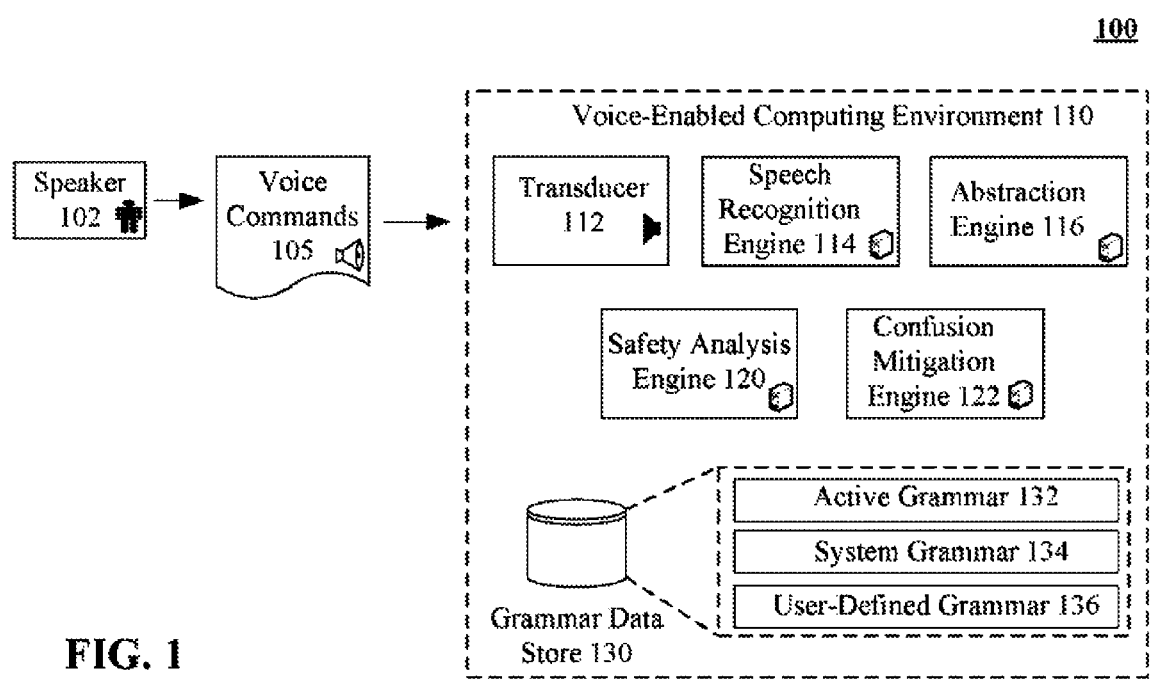
FIG. 1 is a schematic diagram of a system that performs a safety analysis on new voice commands to ensure that the voice commands do not cause speech recognition ambiguities with existing voice commands in accordance with an embodiment of the inventive arrangements disclosed here.

FIG. 1 is a schematic diagram of a system 100 that performs a safety analysis on new voice commands to ensure that the voice commands do not cause speech recognition ambiguities with existing voice commands in accordance with an embodiment of the inventive arrangements disclosed herein. System 100 can include a voice-enabled computing environment 110, which includes a transducer 112, a speech recognition engine 114, and a grammar data store 130.

The voice-enabled computing environment 110 can be any computing environment capable of receiving and responding to voice commands 105 from one or more speakers 102. The voice-enabled computing environment 110 can be a voice-only environment as well as a multimodal environment having other input-output modalities than voice-based ones.

The speaker 102 can be any person or device capable of issuing speech, which includes previously recorded speech and speech issued from a remote location that is locally played via a speaker. The voice command 105 can be any command able to be understood by the voice-enabled computing environment 110, such as a command matching at least one command included in a grammar 132-136 of the grammar data store 130.

Transducer 112 can be a device that converts one form of energy into another form of energy. In environment 110, transducer 112 can convert sound to electrical impulses (acting as a microphone) and/or can convert electrical impulses to sound (acting as a speaker).

Speech recognition engine 114 can convert speech signals into a set of words or phrases understood by a machine. Speech recognition engine 114 can compare acoustic characteristics of received voice commands 105 against a set of commands defined within grammar data store 130. When a match is found, a set of programmatic actions associated with the matched command can be automatically executed.

Grammar data store 130 can include one or more defined grammars 132-136, such as active grammar 132, system grammar 134, and user-defined grammar 136. Data store 130 can include any type of grammars including context-sensitive grammars, context-insensitive grammars, speaker-dependent grammars, speaker-independent grammars, and the like.

Each grammar 132-136 can include a set of commands unique to that grammar. The user-defined grammar 136 can include a set of user-defined commands. The system grammar 134 can include a set of commands, which are defined for a voice-enabled system and cannot be changed by a user. The active grammar 132 can be a grammar including a set of commands/phrases that the speech recognition engine 114 is currently able to recognize. When a context associated with a context-dependent grammar is in a TRUE state, the context-dependent grammar can be included in the active grammar 132. Otherwise, the context-dependent grammar can be excluded from the active grammar 132.

That is, different contexts, modes, and/or states can exist for the environment 110. A set of commands in the active grammar 132 can dynamically change depending on the current context, mode, and/or state of the environment 110. For example, the voice-enabled environment 110 can be placed in a command mode, where the active grammar 132 can include all commands in the system grammar 134 and/or the user-defined grammar 136. In another example, the voice-enabled environment 110 can be placed in a dictation mode, where all incoming audio is recorded and the only active command in the active grammar 132 can include a command to exit the dictation mode. In still another example, the voice-enabled environment 110 can be placed in a record-abstraction mode, where subsequent voice commands are interpreted as activities to be included in an abstraction and/or as a command to terminate the recording.

The voice commands in user-defined grammar 136 can include commands for invoking user-defined abstractions, which are handled by abstraction engine 116. An abstraction can be a set of actions or commands that are grouped. Abstractions are repetitively executed responsive to a single actuation command or event. An abstraction that includes timing information can be referred to as a script. An abstraction having a relative ordering among included actions can be referred to as a macro. An abstraction where included actions are able to be asynchronously executed can be referred to as a collection. The abstraction engine 116 can handle the recording and execution of abstractions.

Before any new user-defined voice command 105 is accepted by the voice-enabled computing environment 110, the safety analysis engine 120 can compare the new command 105 against preexisting commands in the grammar data store 130. The safety analysis engine 120 can parse a voice command 105 into component pieces. Each parsed piece and the entire voice command can be checked for potential ambiguities with preexisting commands. A likelihood of confusion value can be determined for the voice command 105, which represents a likelihood that the new voice command 105 or a parsed portion of it will be confused with an existing command.

In one embodiment a number of configurable confusion thresholds can be established, where different programmatic actions can be taken depending on how confusion values compare to the thresholds. For example, if the likelihood of confusion is low, the new voice command can be immediately accepted. If the likelihood of confusion exceeds a certain threshold, a warning can be presented that the new command may be confused with a preexisting command. If a likelihood of confusion exceeds a maximum threshold, the user-defined command can be automatically rejected, and a user will be forced to either cancel an action for which the new command was being provided or to provide a different user-defined voice command.

In another embodiment an optional criticality weight can be applied to each of the confusion values. This criticality weight can more heavily weigh "important" voice commands, where confusions relating to these commands can be particularly problematic. For example, a system command of "Brake" that stops a vehicle can have a higher criticality weight than a system command for "Soften" that lowers a radio volume.

Generally, when the safety analysis engine 120 indicates that a high likelihood of confusion exists, a user will be presented with a set of user-selectable options, such as an option to provide a different user-defined name, to cancel an action, and/or to accept the voice command 105 despite the potential confusion. When accepting a potentially confusing user-defined voice command 105, one or more actions can be taken by the confusion mitigation engine 122. The confusion mitigation engine 122 is designed to minimize problems caused by voice command ambiguities in any of a variety of manners.

For example, the confusion mitigation engine 122 can require a potentially ambiguous user-defined command to be prefaced with a keyword. The keyword, such as Playback or Execute, can be associated with a context that limits voice commands included in the active grammar 132. It should be emphasized, that when potential confusion with system commands is not an issue, user-defined voice commands can be issued directly and responded to directly, without being prefaced by a keyword.

In another example, the confusion mitigation engine 122 can recognize that the potentially conflicting voice commands are user-defined commands provided by different speakers. The confusion mitigation engine 122 can provide a user selectable option to place the conflicting commands into different speaker-dependent grammars to prevent recognition ambiguities. A different user selectable option can create a single speaker-dependent grammar that includes the potentially confusing user-defined command. When the speaker-dependent grammar is active, the other command can be blocked or overridden to prevent recognition ambiguities. Voice analysis techniques can be used to automatically identify a speaker 102 for purposes of activating/deactivating speaker-dependent grammars In yet another example, the confusion mitigation engine 122 can permit a user to disable or rename an existing voice command, so that the new user-defined command is no longer potentially confusing. This ability can be restricted to non-system commands and/or to other user-defined commands specified by the same user. The above examples of confusion mitigation actions are for illustrative purposes only and the invention is not to be construed as limited in this regard. The confusion mitigation engine 122 can take any programmatic action designed to eliminate or minimize confusion between a new user-defined voice command and one or more preexisting voice commands.

Figure 2:
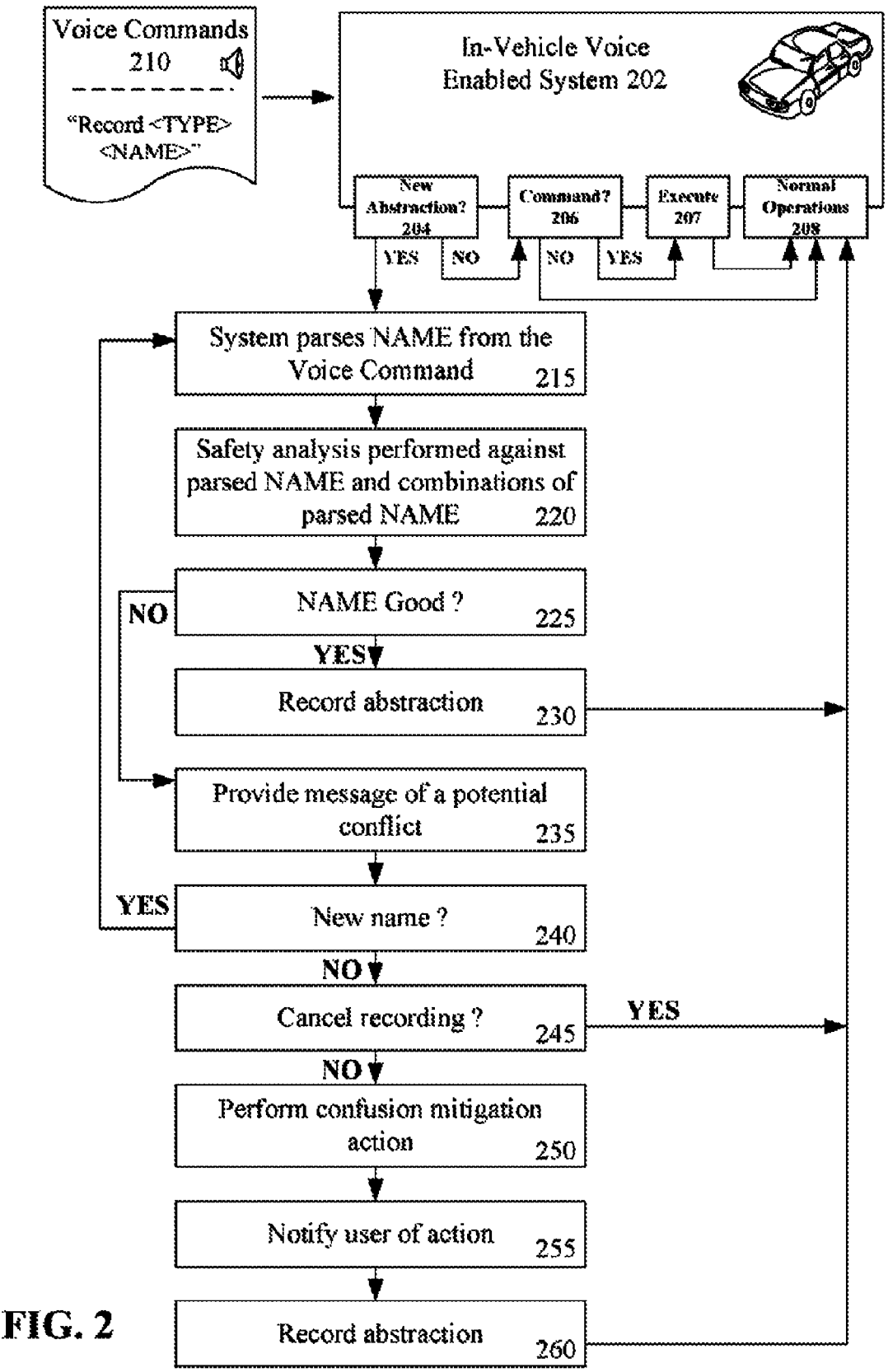
FIG. 2 is a sample system where a safety analysis is performed against new voice commands in accordance with an embodiment of the inventive arrangements disclosed herein.

FIG. 2 is a sample system 200 where a safety analysis is performed against new voice commands in accordance with an embodiment of the inventive arrangements disclosed herein. System 200 can include components shown in system 100. The system 200 can include an in-vehicle voice-enabled system 202, which can be a voice-only system and/or a multimodal system having a speech modality. System 202 can permit a user to define new abstractions, to execute existing abstractions, and the like.

When system 200 receives a voice command 210, a determination 204 can be made as to whether the command is for a new abstraction. If not, a determination 206 can be made as to whether the voice command 210 is a valid command or not. If it is not a valid command, a message can be optionally presented to the user that the command was not understood. The invalid command can be otherwise ignored, and normal operations 208 can be conducted. When recognized as a valid command 206, the in-vehicle voice-enabled system 202 can execute 207 the command. Normal operations 208 can be conducted for system 202 after the command executes 207.

In step 204, commands for recording a new abstraction will normally be prefaced with a keyword, such as Record, recognized by system 202. For example, a voice command 210 for recording a new abstraction can be formatted as "Record <TYPE> <NAME>." Record can be a keyword for beginning an abstraction recording. TYPE can specify a type of recorded abstraction, such as a script, macro, and/or collection NAME can be a new user-defined name for the abstraction.

Once the system receives the command to record a named abstraction, step 215 can be performed, where the system parses the NAME. The NAME can be a phrase, a sentence, or a multi-syllable word, parsed portions of which can be similar to other commands known by system 202. Each parsed portion can be analyzed to determine potential recognition ambiguities. For example, a new command "Breakfast" can be parsed into multiple different sections including: "break," "fast," and "breakfast."

In step 220, a safety analysis can be performed against the parsed NAME and combinations of the parsed NAME. In step 225, if the NAME is good, meaning that it is unlikely to be confused with other preexisting voice commands, the abstraction can be recorded in step 230. A trigger command, such as "End Recording," can be used to end the recording process, after which the abstraction is associated with the recorded actions and stored in system 202. Normal operations 208 of system 202 can resume.

If in step 225, the NAME is not good, a message of a potential conflict can be provided in step 235. A user can be presented with an option to select a new NAME in step 240. If this option is taken, a new NAME can be provided, which the system parses in step 215. If a user indicates that he/she does not want to provide a new NAME, then an option to cancel the recording to the abstraction can be provided in step 245. If the recording is canceled, normal operations can resume 208.

Otherwise, a confusion mitigation action can be performed in step 250. For example, the system 202 can permit the NAME to be used, but only when preceded with an abstraction initialization keyword, such as "Playback" or "Execute." In step 255, a user can be notified of the mitigation action, such as the requirement to precede the NAME with the keyword when invoking the abstraction via a voice command. If other mitigation actions are taken, appropriate user notifications can be presented. In step 260, the abstraction can be recorded, which is ended by a trigger command, such as End Recording. The abstraction can be stored along with the new user-defined voice command of NAME. Normal operations 208 of system 202 can then resume.

Figure 3:
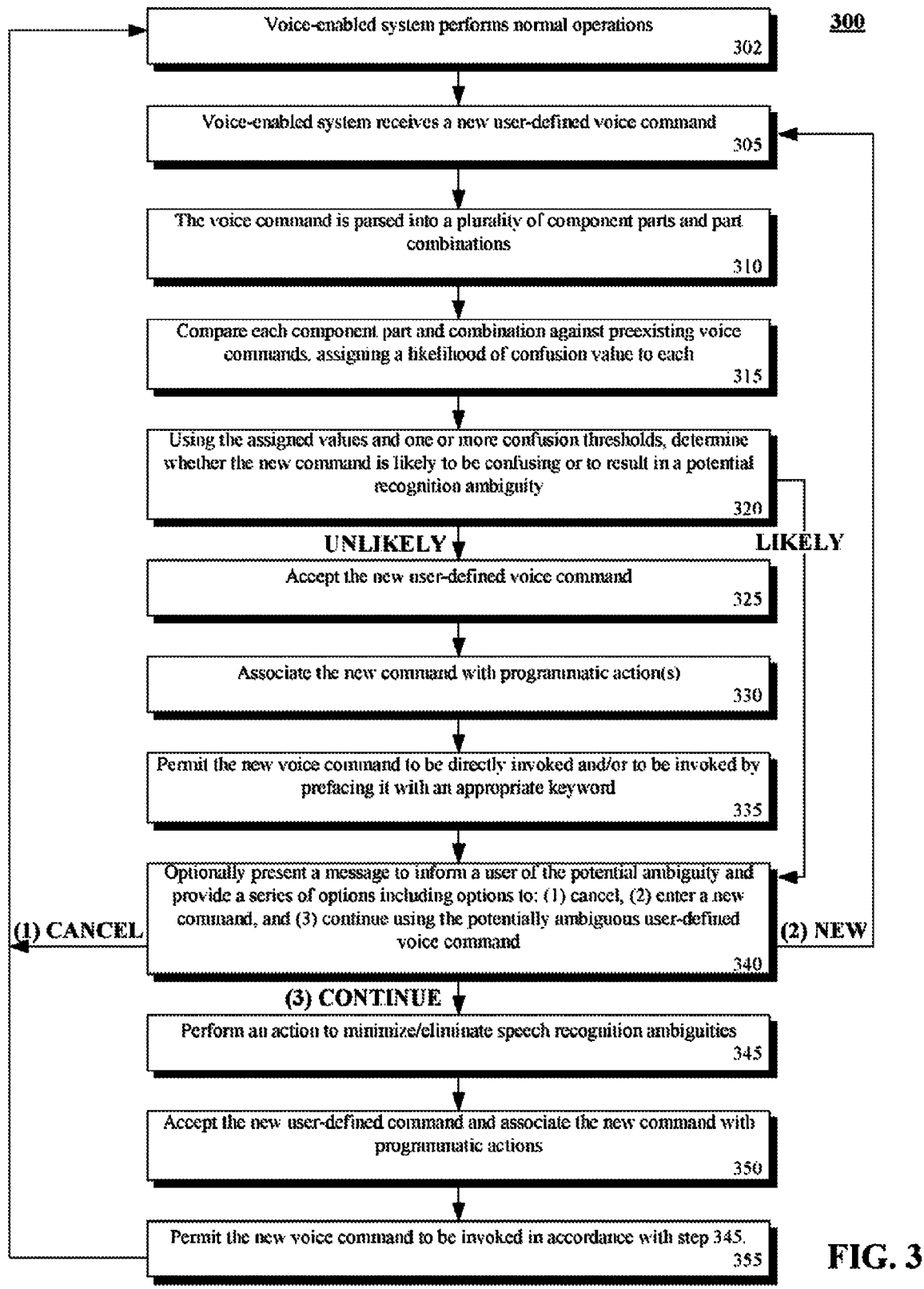
FIG. 3 is a flow chart of a method for checking for potential confusion between new user-defined voice commands and existing commands in accordance with an embodiment of the inventive arrangements disclosed herein.

FIG. 3 is a flow chart of a method 300 for checking for potential contusion between new user-defined voice commands and existing commands in accordance with an embodiment of the inventive arrangements disclosed herein. Method 300 can be performed in the context of a system 100, or any other voice-enabled system.

Method 300 can begin in step 302, where a voice-enabled system can perform normal operations. In step 305, the voice-enabled system can receive a new-user-defined voice command. The new voice command can be received as part of a user-desired process, such as a process to record a new abstraction. In step 310, the voice command can be parsed into a component parts and/or combinations. Each combination or component part can represent a portion of the command that the voice-enabled system may attempt to speech recognize.

In step 315, each component part and/or combination can be compared against preexisting voice commands. A likelihood of confusion value can be assigned to each. In step 320, the assigned confusion values can be compared against one or more confusion thresholds. These comparisons can determine whether the new command is likely to result in a potential recognition ambiguity due to an acoustic similarity between the new command and a preexisting command.

If confusion is unlikely, the method can proceed to step 325, where the new user-defined voice command can be accepted. In step 330, the new command can be associated with one or more programmatic actions. In step 335, the voice-enabled system can permit the new voice command to be directly invoked and/or to be invoked by prefacing it with an appropriate keyword, such as "Playback". The method can loop from step 335 to step 302, where normal operations can resume.

If in step 320, confusion is likely, the method can proceed to step 340, where a message of a potential recognition ambiguity can be optionally presented. A series of options for handling the ambiguity can be provided, which include (1) canceling a current operation, (2) entering a different command, and (3) continuing to use the potentially ambiguous user-defined voice command. When a user elects option (1) to cancel the current operation, the operation can be canceled and the method can loop to step 302, where normal operations can resume. The user can also elect option (2) to provide a different user-defined command, which causes the method to loop to step 305, where the command can be received and processed.

When option (3) is selected, the method can proceed from step 340 to step 345. In step 345, an action can be performed to minimize and/or eliminate the speech recognition ambiguity. The action can isolate the new user-command to a restricted context or namespace, such as one entered after a keyword, such as "Playback" is received. The restricted context can be one that does not include the potentially ambiguous word. The existing and potentially conflicting voice command can also be renamed, disabled, contextually isolated, and/or deleted. In step 350, the new user-defined command can be accepted and can be associated with one or more programmatic actions. In step 355, the command can be enabled so that the voice-enabled system permits the command to be invoked in accordance with any conditions or restrictions established in step 345. The method can proceed from step 355 to step 302, where normal operations can resume.

Figure 4:
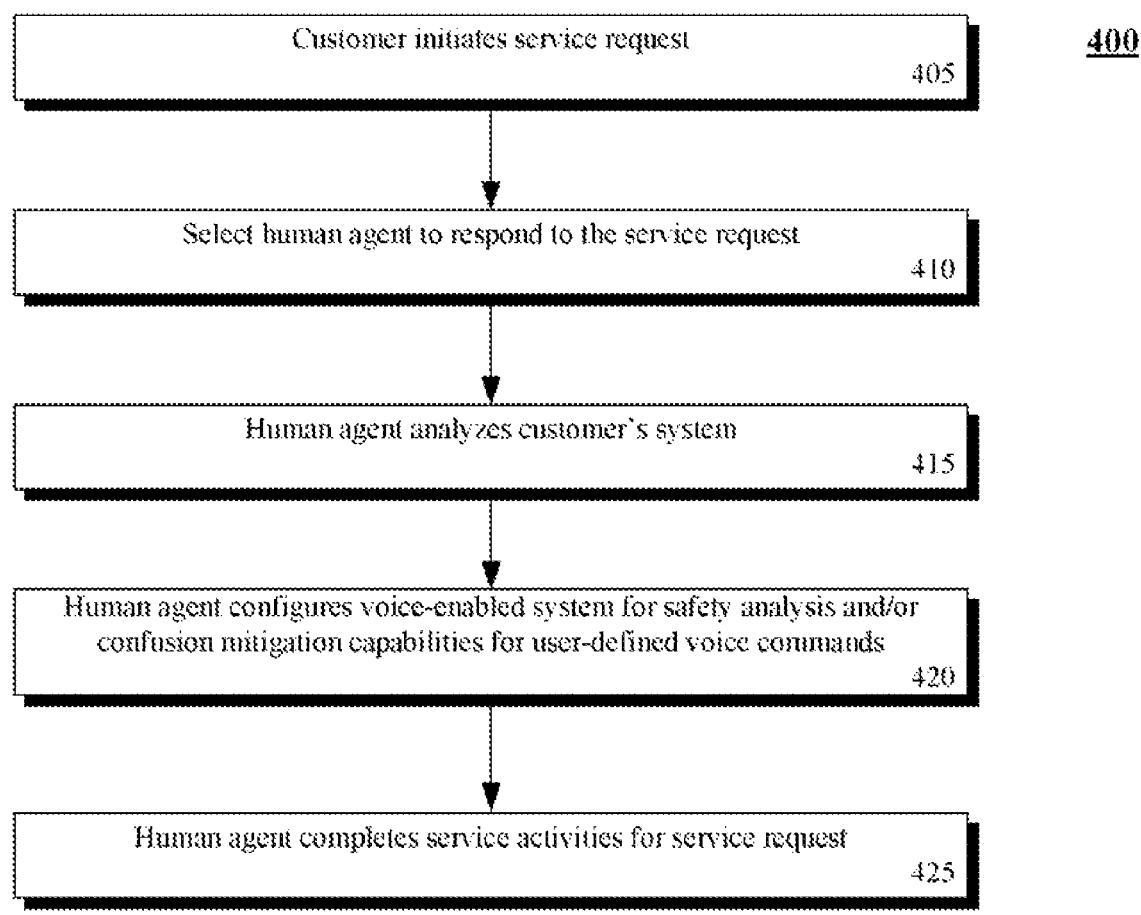
FIG. 4 is a flow chart of a method, where a service agent can configure a system that performs a safety analysis before storing new voice commands in accordance with an embodiment of the inventive arrangements disclosed herein.

FIG. 4 is a flow chart of a method 400, where a service agent can configure a system that performs a safety analysis before storing new voice commands in accordance with an embodiment of the inventive arrangements disclosed herein. Method 400 can be preformed in the context of system 100 and/or a method 300.

Method 400 can begin in step 405, when a customer initiates a service request. The service request can be a request for a service agent to add a safety analysis engine to an existing voice-enabled system lacking that capability. The request can also be a request to repair a problem with a safety analysis engine and/or a conflict mitigation engine of a pre-existing voice-enabled system. Further, the service request may be a request for training relating to a voice-enabled system and/or a request to customize a configuration of an otherwise operational voice-enabled system. In step 410, a human agent can be selected to respond to the service request. In step 415, the human agent can analyze a customer's current system and can develop a solution.

In step 420, the human agent can configure the customer's system to enable safety analysis functions and/or conflict mitigation functions in accordance with the service request. In one embodiment, this configuration need not occur upon the customer's system itself, but can instead involve configuring a network element or a remotely located system used by the customer. For example, a customer's system can be linked to a WEBSPHERE component that provides speech processing functionality for the customer's system. The service request can be to upgrade the WEBSPHERE component to enable safety analysis and conflict mitigation functionality with regards to user-definable voice commands. In step 425, the human agent can complete the service activities.

It should be noted that while the human agent may physically travel to a location local to adjust the customer's computer or application server, physical travel may be unnecessary. For example, the human agent can use a remote agent to remotely manipulate the customer's computer system, The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context, means any expression, in any language., code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for use in a voice-enabled system that permits a user to define one or more new voice commands, the method comprising acts of:
    identifying a user attempt to define a new voice command that is not yet defined in the voice-enabled system, the user attempt comprising a proposed voice command to be associated with a voice-enabled capability in the voice-enabled system, wherein the user attempt fully specifies the proposed voice command;
    in response to the user providing the proposed voice command as part of the user attempt to define a new voice command, performing, by at least one processor, a safety analysis on the proposed voice command to determine a likelihood that the proposed voice command would be confused with at least one existing voice command that the voice-enabled system was programmed to recognize prior to the act of identifying a user attempt to define a new voice command, wherein the safety analysis is performed after the act of identifying the user attempt; and
    parsing the proposed voice command into a plurality of component parts, wherein the safety analysis is performed against at least one component part; and
    when a high likelihood of confusion is determined by the safety analysis, presenting a notification that the proposed voice command is subject to potential confusion.

2. The method of claim 1, wherein the voice-enabled capability comprises a user-defined abstraction.

3. The method of claim 2, further comprising acts of:
    accepting the proposed voice command as a new voice command for the user-defined abstraction after the safety analysis is performed;
    after the act of accepting the proposed voice command, recording a plurality of actions associated with the user-defined abstraction; and
    storing the plurality of actions in association with the new voice command to enable the user to subsequently invoke an execution of the plurality of actions by speaking the new voice command.

4. The method of claim 1, further comprising acts of:
    when a high likelihood of confusion is determined by the safety analysis, presenting a warning message to the user that the proposed voice command is likely to be confused with a different voice command; and
    permitting the user to retain the proposed voice command as a new voice command recognized by the voice-enabled system.

5. The method of claim 4, further comprising acts of:
    requiring the user to preface the new voice command with a keyword when invoking the new voice command; and
    allowing other user-defined commands that do not have a high likelihood of confusion as determined by the safety analysis to be invoked without being prefaced with a keyword.

6. The method of claim 1, further comprising an act of:
    when a low likelihood of confusion is determined by the safety analysis, accepting the proposed voice command as a new voice command recognized by the voice-enabled system.

7. The method of claim 1, further comprising an act of:
    providing an option to propose a different voice command, when a high likelihood of confusion is determined by the safety analysis.

8. The method of claim 1, further comprising acts of:
    when a high likelihood of confusion is determined by the safety analysis and when a user elects to accept the proposed voice command as a new voice command recognized by the voice-enabled system, performing at least one programmatic action to reduce recognition ambiguities between the at least one existing voice command and the new voice command.

9. The method of claim 1, wherein the safety analysis is performed against each component part.

10. The method of claim 1, further comprising acts of:
    receiving a service request;
    selecting at least one service agent; and
    manipulating, by the at least one service agent, at least one computing device to enable a safety analysis function.

11. A method of adding user-defined abstractions to a voice-enabled system, the method comprising acts of:
    detecting an attempt to record a new abstraction;
    receiving a proposed voice command for use when invoking the new abstraction, the proposed voice command being proposed as part of the attempt to record the new abstraction, wherein receiving the proposed voice command comprises receiving the entire proposed voice command;
    in response to the act of receiving the proposed voice command for use when invoking the new abstraction, comparing the proposed voice command against a set of existing voice commands that the voice-enabled system was programmed to recognize prior to the act of receiving the proposed voice command to determine whether the proposed voice command is likely to be confused with at least one of the existing voice commands, wherein the act of comparing the proposed voice command against the set of existing commands is performed after the act of receiving the proposed voice command;

parsing the proposed voice command into a plurality of component parts, wherein each the act of comparing the proposed voice command against the existing voice commands comprises comparing at least one component part against one or more of the existing voice commands;

when it is determined that the proposed voice command is likely to be confused with at least one of the existing voice commands, performing at least one programmatic action designed to reduce a likelihood of an occurrence of a potential recognition ambiguity between the proposed voice command and the at least one of the existing voice commands;

recording a plurality of actions associated with the new abstraction; and associating the new abstraction with the proposed voice command to enable a user to subsequently invoke an execution of the plurality of actions by speaking the proposed voice command.

12. The method of claim 11, wherein said at least one programmatic action comprises an action selected from a set of actions consisting of:

substituting a different voice command for the proposed voice command;

limiting a recognition of the proposed voice command to situations where the proposed voice command is prefaced with a keyword; and placing the proposed voice command in a first grammar different from a second grammar containing the at least one of the existing voice commands where the first and second grammars are not simultaneously activated by the voice-enabled system.

13. The method of claim 11, further comprising acts of:
receiving a service request;
selecting at least one service agent; and
manipulating, by the at least one service agent, at least one computing device to enable a safety analysis function.

14. A voice-enabled system comprising:
at least one processor programmed to implement;
a speech recognition engine configured to accept speech, to compare the speech with voice commands in a grammar, and to automatically execute programmatic actions associated with at least one voice command responsive to a match between the speech and the at least one voice command; and
a safety analysis engine configured to, in response to and after the at least one processor receiving a proposed voice command for use in invoking at least one action in the voice-enabled system, the proposed voice command being received in its entirety and being not yet defined in the voice-enabled system as a command for invoking the at least one action;
parse the proposed voice command into a plurality of component parts;
determine, based at least in part on a comparison of at least one component part of the plurality of component parts against one or more existing voice commands in the grammar, a likelihood that the proposed voice command would be confused with at least one existing voice command in the grammar so as to determine whether the proposed voice command is permitted to be added to the grammar.

15. The system of claim 14, wherein the at least one processor is further programmed to implement:
a confusion mitigation engine configured to automatically execute at least one programmatic action designed to reduce the likelihood of confusion between the proposed voice command and the at least one existing voice command in the grammar.

16. The system of claim 15, wherein the confusion mitigation engine is configured to present a notification to a user that the proposed voice command is subject to potential confusion whenever a high likelihood of confusion is determined by the safety analysis engine.

17. The system of claim 15, wherein the confusion mitigation engine is configured to, when the safety analysis engine determines that the proposed voice command has a high likelihood of confusion with at least one existing voice command in the grammar, require the proposed voice command to be preceded by a keyword in order to be invoked, wherein at least one other user-defined voice command having a low likelihood of confusion as determined by the safety analysis engine is allowed to be directly invoked without the keyword.

18. The system of claim 15, wherein the confusion mitigation engine is configured to automatically define a restricted set of one or more users who are allowed to utilize the proposed voice command to prevent potential conflicts with at least one other voice command that is not available to any user in the restricted set but is available to at least one other user of the voice-enabled system.

19. The system of claim 14, wherein the at least one processor is further programmed to implement:
an abstraction engine configured to record and execute user-defined abstractions, wherein the at least one action comprises at least one user-defined abstraction recorded by the abstraction engine.

20. The system of claim 14, further comprising:
at least one grammar of system-defined voice commands, wherein the speech recognition engine and the safety analysis engine are adapted to process the system-defined voice commands.

* * * * *